United States Patent [19]

Oetringhaus

[11] Patent Number: 4,511,100

[45] Date of Patent: Apr. 16, 1985

[54] RAILLESS VECHICLE UNDERGROUND MINING

[75] Inventor: Walter G. Oetringhaus, Oberhausen, Fed. Rep. of Germany

[73] Assignee: M.A.N. Maschinenfabrik Aktiengesellschaft, Augsburg-Nuremberg, Fed. Rep. of Germany

[21] Appl. No.: 473,606

[22] Filed: Mar. 9, 1983

[30] Foreign Application Priority Data

Mar. 13, 1982 [DE] Fed. Rep. of Germany ....... 3209294

[51] Int. Cl.³ .................... B60L 9/04; H02G 11/00
[52] U.S. Cl. ....................... 242/86.51; 191/12.2 A
[58] Field of Search ............... 242/54 R, 75.3, 75.53, 242/86.51, 865 R; 180/2 R, 65 R, 271; 191/12.2 R, 12.2 A

[56] References Cited

U.S. PATENT DOCUMENTS 1,765,547  6/1930  Sloane ..................... 191/12.2 A
2,395,302  2/1946  Slomer .................... 242/86.51
4,108,264  8/1978  Tanaka .................... 242/86.51 X
4,258,834  3/1981  Hawley ................... 242/82

Primary Examiner—Stuart S. Levy
Assistant Examiner—Lloyd D. Doigan
Attorney, Agent, or Firm—McGlew and Tuttle

[57] ABSTRACT

A railless vehicle for use underground is equipped with a three-phase asynchronous motor as the principal drive, and a power distributor with a plurality of power inputs as well as a magazine drum for the wind up or pay out of the power supply line. The drum 2 is connected to the distributor 8 through a hydrostatic drive 10. The control of hydrostatic drive 10 is a function of the slack of the free, not wound up portion of the supply line 3. This slack is detected by a contact lever 5, translated by a converter 14, and transmitted to a torque control 13, to vary the wind up or payout speed of the drum. Any undue horizontal and vertical deflections of the power supply line 3 are effective to switch off the principal drive 7.

1 Claim, 7 Drawing Figures

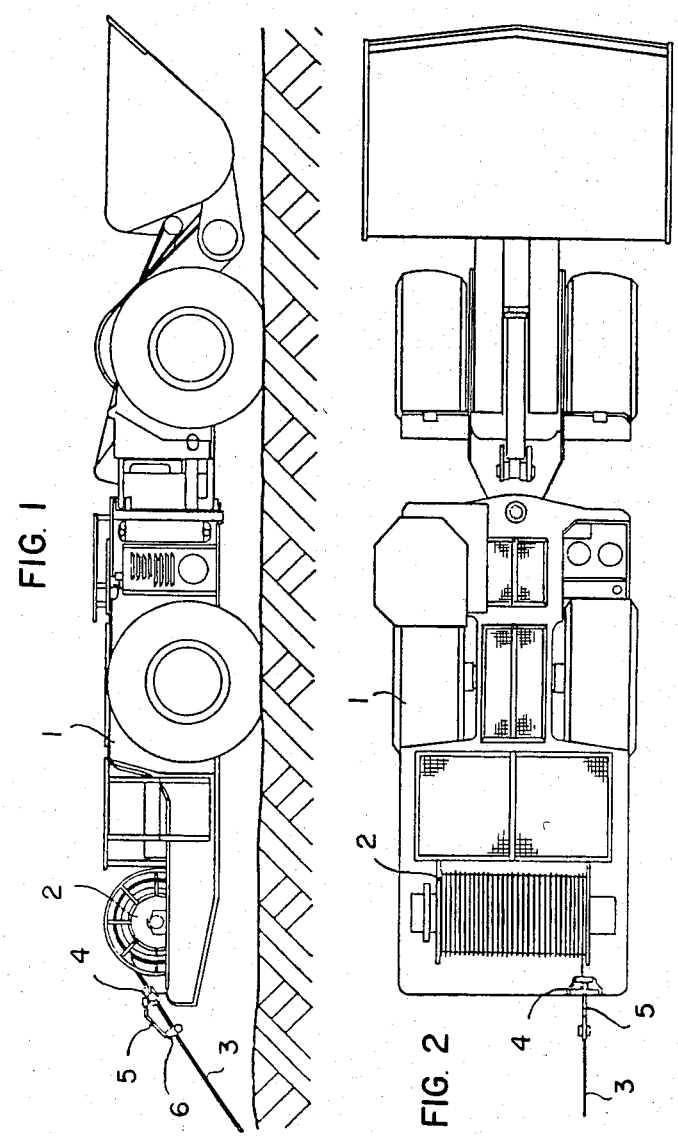

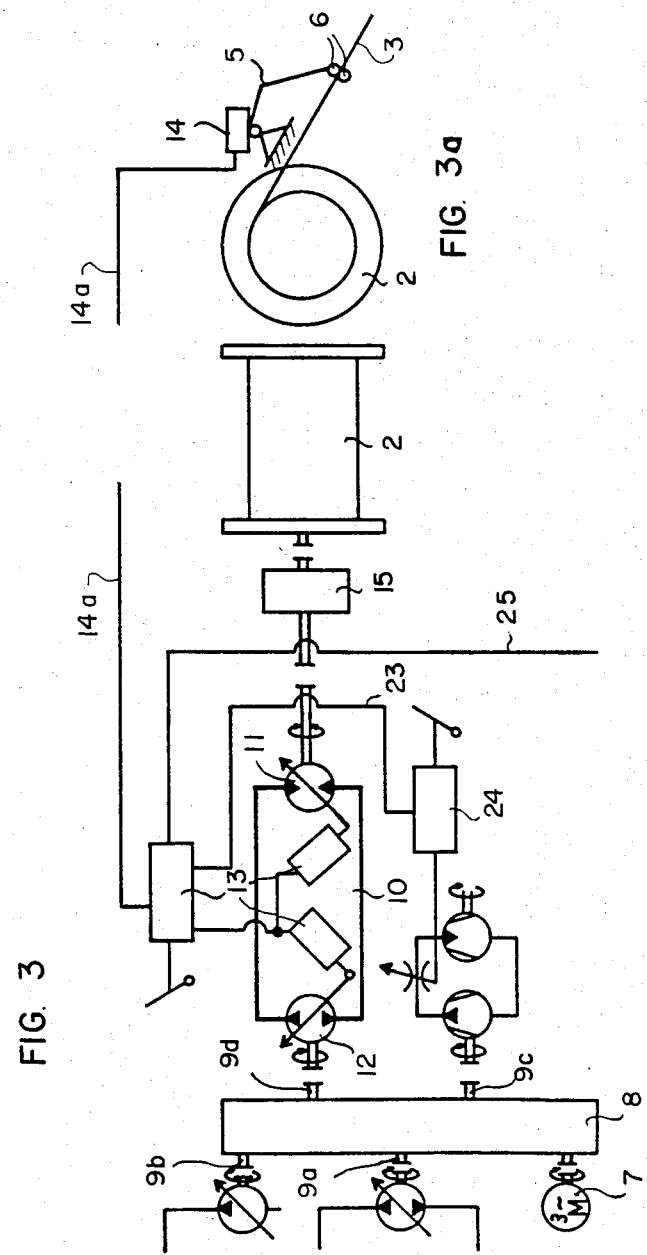

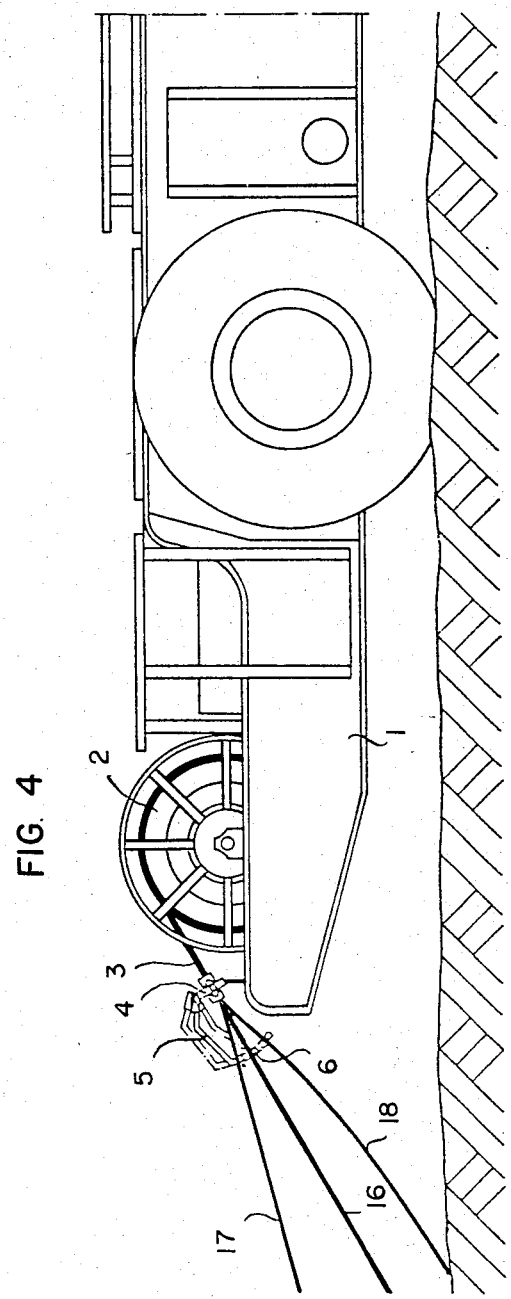

RAILESS VEHICLE FOR UNDERGROUND MINING

FIELD AND BACKGROUND OF THE INVENTION

This invention relates in general to mining devices and in particular to a new and useful railess vehicle for use underground.

In many mining operations underground, the use of Diesel vehicles is very problematic, due to the ventilation conditions. Loading of the mine air with waste heat and noxious substances from a Diesel engine cannot always be compensated for, and at least the ventilating costs are considerably increased if Diesel vehicles are employed. For this reason, electrically operated, railess vehicles are used at a growing rate, with which these air loading factors are absent or at least minimized. Since underground loaders and hauling vehicles must handle large amounts of material within short periods of time, even with a simultaneous negotiation of slopes, their drives must be correspondingly strongly dimensioned. With a plurality of power inputs for separate drive mechanisms on the vehicle, this leads to designs of mine vehicles which are clumsy in the restricted space conditions underground.

The power for the vehicle is supplied through a line leading from stationary underground energy sources to the vehicle, where it is wound onto a magazine drum. Now, depending on the travel direction of the vehicle, the power supply line must be either wound up or unwound from the drum. The direction of rotation and angular speed of the magazine drum are derived from the respective tensile stress in the supply line. A constant, more or less high and swelling tensile stress in the supply line, frequently leading to whipping movements, wears the line down rapidly and damages it mechanically to a large extent.

Therefore, in cable drums equipped with a separate drive motor, it has already been provided to determine the variations in the slack of the freely extending portion of the supply cable by means of a sensing device, and transmit them to an electric or switching device (German Pat. No. 55696). This is accomplished by means of a pendulum-type twing arm bearing against the supply cable through rollers. Further, the elimination of the tensile stress is particularly dealt with in German OS No. 23 37 425. In both instances, the control signals effect a variation in the speed of the drum driving motors. Such speed-controlled electric motors (stop motors) are subject to particularly strong loads when the are started with a full rated torque from their standstill position. Such drive motors require much power and must be bulky and heavy to satisfy the requirements imposed on them in underground service. Under the conditions of higherpower and dynamic reversing operations underground, partly with the supply line fully wound up on the magazine drum, such motors are uneconomical. The electrical drive disclosed in the abovementioned German OS No. 23 37 425 is yet bulkier, due to a provided drive motor, and is burdened with high power losses, particularly upon an application of the maximum torque while starting the drum.

SUMMARY OF THE INVENTION

The invention is directed to an elimination of these drawbacks and to a vehicle requiring a minimal power supply while better complying by its guide equipment with the tremendous loads to which it is exposed in underground operations, and having in addition dimensions adapted to the restricted conditions underground.

In accordance with the invention a railess vehicle includes a vehicle body which is moved by an electrically operated motor carried on the body which is supplied by power through an electrical cable which is wound on a drum on the vehicle. For this purpose the vehicle has a rotatable magazine drum which is driven by a hydraulic drive including a pump which drives a hydraulic motor under the control of a torque control or power amplifier. The pump is driven from a three-phase asynchronous motor which also drives the vehicle which is connected to a power distributor which has a connection to drive the pump. The torque control for the hydraulic motor for driving the rotatable magazine drum in a selected direction is controlled by a sensor which senses the position of the power line relative to the drum so as to obtain an indication of both the slack or unslackened conditions as well as its locatation relative to a lateral feed to the drum. This is accomplished by a contact lever which is engaged with the power line and which operates through a converter to provide a signal to the torque control for the drive motor.

It has been found particularly advantageous to employ a three-phase asnychronous motor. Such motors hitherto been used for stationary mounting. They must be protected particularly well against the ambience and, preferably, may be of explosion-proof design, if necessary. The transmission of the uncontrolled power of these motors to the travel drive and the other power inputs of the vehicle is effected through distributors or another power distributing mechanism. The use of an uncontrolled three-phase asynchronous motor as the principal drive motor of a railess underground vehicle, and equipped with a mechanism distributing the power to a plurality of power inputs connecting to loads which vary in time and absolute values, makes the total loading of the principal motor uniform, since the unequal individual loads are summed up through the power distributing mechanism.

Another effect resulting from the invention design is that neither a tensile stress is produced in the supply line at abrupt changes in the travel direction or travel speed, nor is the line slackened upon a travel start in the opposite direction. It is further ensured that temporarily, the magazine drum is supplied with the respective drive torque needed for unwinding and winding up of the supply line in a completely satisfactory manner. Also, while negotiating curves, the supply line is deposited on the floor in the wake of the vehicle, and remains absolutely torsionfree. This is achieved by providing a controlled hydrostatic drive between the principal drive motor and the magazine drum. The small inertia of a hydraulic system is advantageous in this connection, since the response to the control is very quick. The torque control used for controlling the hydrostatic drive multiplies to a several times higher value the control pressure and this is determined by means of the contact lever at the supply line and transmitted through the closed drive circuit. This augmented pressure is proportional to the drive torque of the magazine drum. To be able to produce the control signals for the hydrostatic drive, the oscillatory movements of the contact lever must be converted to pressure signals. In addition, the contact lever system is so designed that upon a functional failure of the cable drum, which is followed by a slack or tensile stress in the supply line, the deflection of the contact lever vertically beyond a predetermined or adjustable limit value causes the principal drive motor to be switched off and the vehicle to be braked down. The same goes for a horizontal deflection of the contact lever caused by a lateral taking up or paying out of the supply line, in excess of a predetermined or adjustable limit value. Upon being deflected through about 80% of the control range, the contact lever chokes down the travel drive of the vehicle through control mechanisms, to prevent the principal drive from being switched off upon a too vigorous start. If a high-speed hydraulic motor is employed in the hydrostatic drive, the mechanical reduction gear is inserted between the hydrostatic pump and the magazine drum.

Accordingly, it is an object of the invention to provide an improved electrically operated railess vehicle for use underground which is supplied with power from a stationary energy source and which includes a power supply line which is wound up on the vehicle as it moves in a selected direction and wherein the vehicle is driven by a three-phase asynchronous motor driving through a power distributor and which also includes a hydrostatic drive for the windup drum for the power line in an arrangement in which the slack of the line is sensed and the hydraulic drive control to drive the drum in a selected direction in accordance with the slack position of the power line relative to the drum.

A further object of the invention is to provide a railess vehicle which is simple in design, rugged in construction and econimical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 1 is a side elevational view of an underground mobile loader vehicle constructed in accordance with the invention;

FIG. 2 is a top plan view of the vehicle shown in FIG. 1;

FIG. 3 is a schematic diagram of the power connections for the drive of the vehicle;

FIG. 3(a) is a schematic side view diagram of the drum and control lever;

FIG. 4 is a partial side view of the front portion of the vehicle indicating the various operating conditions of the power line sensor;

DESCRIPTION OF THE PREFERRED EMBODIMENTS

Figure 5:
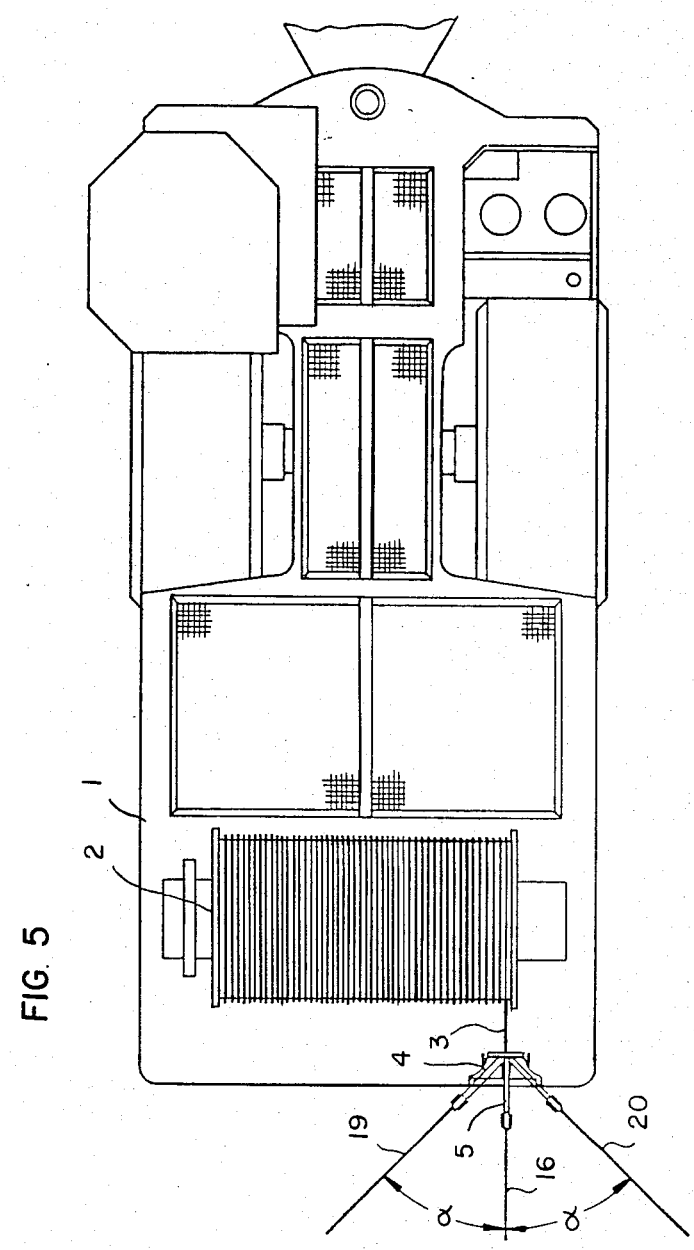
FIG. 5 is a top plan view of the portion of the vehicle shown in FIG. 4.

Referring to the drawings in particular the invention embodied therein comprises an electrically operated railess vehicle having a vehicle body in the form of a loader 1 which is used underground in mining operations. The vehicle is supplied with power from a stationary energy source to a supply line 3 which is wound onto and unwound from a magazine drum 2 mounted on the vehicle body 1. The power line 3 is maintained such that its tensile stress is taken away from the line as a function of the traveling motion of the vehicle. The drum 2 is rotated in the selected direction by a hydrostatic drive generally designated 10 as shown in FIG. 3 which includes a pump 12 connected to a hydraulic motor 11 and through a reduction gear 15 to the magazine drum 2. The pump 12 is driven from the connection 9d of a power distributor 8 which is connected to a drive motor 7 which comprises a three-phase asynchronous motor. The hydrostatic drive 10 is driven under the control of a torque control or power amplifier 13 whose control signals are received from a converter 14 which is operated by a contact lever 5 which together with rollers 6 form sensing means which sense the position of the power line 3 relative to the windup drum 2. The sensing means associated with the power cable 3 sense both the slack or unslackened condition of the power cable and also the lateral direction of the power cable as indicated in FIG. 5.

An electrically operated underground mobile loader or vehicle 1 carries on its end a magazine drum 2 intended for winding thereon, and unwinding therefrom, a line 3 through which the vehicle is supplied with power. To be able to adjust the annular speed of drum 2 to the traveling speed and direction of loader 1, a contact lever 5 is provided which is mounted on a winding mechanism 4 by which the individual turns of the line are distributed over the width of drum 2. In its normal position, contact lever 5 applies through rollers 6 to the portion between drum 2 and the floor, of the supply line 3, hanging down freely without tensile stress. As diagrammatically shown in FIG. 3, a power distributor 8 is connected to a principal drive motor 7 of loader 1 and stress operates on a plurality of rotary power inputs outputs 9a to 9d. These power outputs 9a, 9b, 9c and 9d may include, for example, a drive 9a for steering the vehicle, a drive 9b for operating the hydraulic system, and the hydraulic travel drive 9c. A power input for the hydrostatic drive 10 of the magazine drum is indicated at 9d. This hydrostatic drive 10 comprises a hydraulic motor 11 and a hydrostatic pump 12. Magazine drum drive 10 is controlled by pressure signals which are produced in a torque control or power amplifier 13. The starting point for the control signals are the oscillating movements of contact lever 5 which are converted into pressure signals in a converter 14 which are transmitted through a line 14a to the amplifier 13. The indicated mechanical reduction gear 15 between hydraulic motor 11 and magazine drum 12 is provided in instances where a high-speed hydraulic motor is employed.

In FIG. 4, the normal position of power supply line 3, with vehicle 1 stopped, is indicated at 16. Upon starting the travel in the forward direction, the exerted pull moves power line 3 toward the position thereof indicated at 17. Any even so small movement of power supply line 3 is transmitted through contact lever 5, converter 14, and power amplifier 13 to drum drive 10, so that due to the minimum inertia of the hydraulic system, magazine drum 2 is set in unwinding motion almost instantly with the traveling start of loader 1.

The same takes place as loader 1 starts moving rearwardly. Such a motion causes power supply line 3 to move in the direction of position 18, and, through control and switching means 5, 14, 13 and drive means 10, to start to be wound up on magazine drum 2. Power supply line 3 will be wound on or off drum 2 in accordance with the traveling speed of loader 1, forward or rearward. Upon exceeding the adjustable limit values corresponding to positions 17 and 18, principal drive motor 7 of loader 1 will be switched off through a control line 23 and a travel controller 24, and the loader will be braked down through a control line 25 (FIG. 3).

Figure 6:
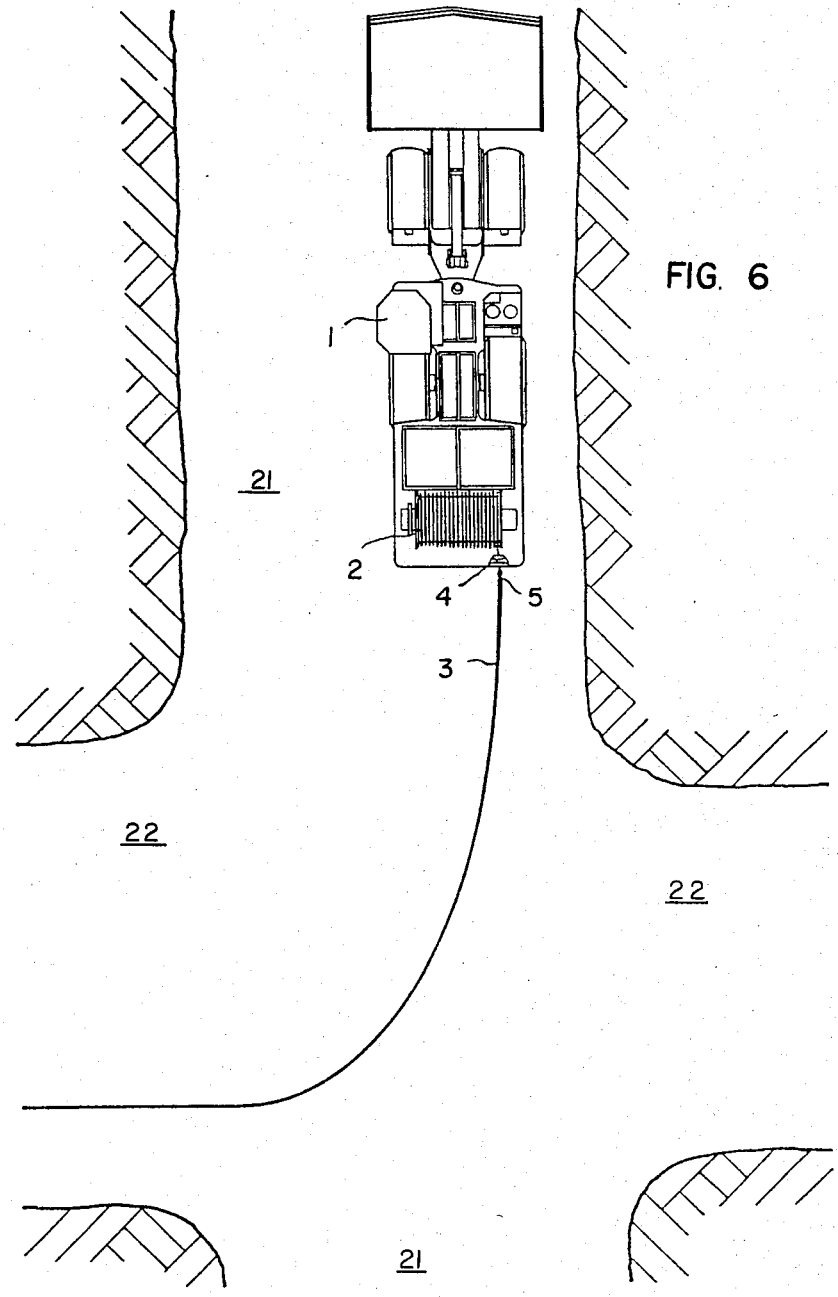
FIG. 6 is a plan view of the vehicle indicated at the crossing point of passages in a mine excavation.

The same happens if power supply line 3 becomes deflected laterally beyond a permissible angle α, which may occur while negotiating sharp curves, for example. In such a case, as shown in FIG. 5, contact lever 5 will be deflected sidewards, thus horizontally, from its normal position 16 toward one of the adjustable limit positions 19 or 20, and upon exceeding such a position, principal drive motor 7 will be switched off through control line 23 and travel controller 24, and the vehicle will be braked down through control line 25. In both the vertical and the horizontal sensing action of contact lever 5, it is provided that upon a deflection through about 80% of the control range angle, a control mechanism starts to choke down the travel drive, so that upon a too quick start, the traveling speed is reduced. During normal travel, power supply line 3 is being deposited without tensile stress or torsion in the wake of loader 1, as shown in FIG. 6 for a situation where the vehicle has passed a crossing of two roadways 21 and 22.

While specific embodiments of the invention have been shown and described in detail to illustrate the application of the principles of the invention, it will be understood that the invention may be embodied otherwise without departing from such principles.

What is claimed is:

1. An electrically operated railess underground vehicle which is adapted to be supplied with electrical power from a stationary energy source of electrical power, comprising:

a vehicle body (1);
   a rotatable magazine drum (2) mounted on said body;
   a power line (3) adapted to be connected to a power source for operating said vehicle and windable on said drum in a winding direction and in an unwinding direction;
   a three phase asynchronous motor (7) mounted on said body;
   a power distributor (8) mounted on said body and connected to said asynchronous motor, said distributor having at least two rotary power outputs (9d,9c) rotatable by said asynchronous motor;
   a controllable hydrostatic drum drive (10) connected to one of said outputs (9d) and including a hydraulic pump (12) and a hydraulic motor (11) rotatable by said pump to rotate said drum in the winding direction and in the unwinding direction;
   a torque control (13) connected to said hydrostatic drum drive for controlling a speed and a direction of rotation of said hydraulic motor;
   a controllable hydrostatic vehicle travel drive connected to the other output (9c) of said distributor for causing said vehicle to travel in a selected direction;
   a travel drive control (24) connected to said vehicle travel drive and to said torque control for stopping travel of the vehicle in response to a limiting signal from said torque control;
   a converter (14) connected to said torque control for supplying signals to said torque control including a signal for rotating said drum in the winding direction, a signal for rotating said drum in the unwinding direction and a limitation signal for causing said torque control to generate its limiting signal to stop the travel of said vehicle;
   a lever member (5) connected to said converter and engaged with said power line, said lever member being pivotable upwardly and downwardly with changes in a relative angular position between said power line and said vehicle body for causing said converter to supply signals to said torque control for winding and unwinding said drum, said lever member movable out of a selected range of upward and downward positions to cause said converter to generate said limitation signal for stopping travel of said vehicle, said lever member being movable in a selected lateral angular range, said lever member causing said converter to generate said limitation signal when said cable moves out of said lateral range to stop travel of said vehicle; and
   a brake line connected to said torque control for carrying said limiting signal of said torque control for braking travel of said vehicle.

* * * * *